US010841115B2

(12) United States Patent
Anderson et al.

(10) Patent No.: US 10,841,115 B2
(45) Date of Patent: Nov. 17, 2020

(54) SYSTEMS AND METHODS FOR IDENTIFYING PARTICIPANTS IN MULTIMEDIA DATA STREAMS

(71) Applicant: Theta Lake, Inc., San Mateo, CA (US)

(72) Inventors: James E. Anderson, Ashburn, VA (US); Derek Brenner, Santa Barbara, CA (US); Anthony Cresci, San Francisco, CA (US); Sharon Hüffner, Berlin (DE); Rohit Jain, Ventura, CA (US); Devin H. Redmond, Encinitas, CA (US); Richard B. Sutton, San Mateo, CA (US)

(73) Assignee: Theta Lake, Inc., San Mateo, CA (US)

( * ) Notice: Subject to any disclaimer, the term of this patent is extended or adjusted under 35 U.S.C. 154(b) by 0 days.

(21) Appl. No.: 16/676,891

(22) Filed: Nov. 7, 2019

(65) Prior Publication Data

US 2020/0145241 A1    May 7, 2020

Related U.S. Application Data

(60) Provisional application No. 62/756,806, filed on Nov. 7, 2018.

(51) Int. Cl.
| | |
|---|---|
| *H04L 12/18* | (2006.01) |
| *G10L 17/00* | (2013.01) |
| *G06K 9/00* | (2006.01) |
| *H04N 7/15* | (2006.01) |

(52) U.S. Cl.
CPC ...... *H04L 12/1822* (2013.01); *G06K 9/00288* (2013.01); *G10L 17/005* (2013.01); *H04N 7/155* (2013.01)

(58) Field of Classification Search
CPC ............ H04L 12/1822; G06K 9/00288; G10L 17/005; H04N 7/155
See application file for complete search history.

(56) References Cited

U.S. PATENT DOCUMENTS

| | | | |
|---|---|---|---|
| 7,757,171 | B1 | 7/2010 | Wong et al. |
| 8,078,603 | B1 | 12/2011 | Chandratillake et al. |
| 8,620,136 | B1 | 12/2013 | Malegaonkar et al. |
| 9,992,330 | B1 | 6/2018 | Hodge |
| 2005/0053207 | A1 | 3/2005 | Claudatos et al. |
| 2007/0198323 | A1 | 8/2007 | Bourne et al. |
| 2007/0239457 | A1 | 10/2007 | Sorvari et al. |
| 2008/0228581 | A1 | 9/2008 | Yonezaki et al. |

(Continued)

*Primary Examiner* — Stella L. Woo
(74) *Attorney, Agent, or Firm* — Goodwin Procter LLP

(57) ABSTRACT

Methods of and systems for identifying a discrete participant among a plurality of participants in an audio/video communication (e.g., video content, digital video content, audio content, and audio-visual content) that include: receiving the audio/video communication; identifying from the audio/video communication content (e.g., using metadata from the broadcast content to identify each participant) multiple identification-related features for each participant; associating a first identification-related feature of a first participant to a second identification-related feature of the first participant; organizing the associated identification-related features of the first participant into a feature class(es); logically relating a first feature class to a second feature class; and attributing a grouping of logically-related feature classes to the discrete participant.

34 Claims, 12 Drawing Sheets

(56) References Cited

U.S. PATENT DOCUMENTS

| | | | |
|---|---|---|---|
| 2010/0063815 A1 | 3/2010 | Cloran et al. | |
| 2014/0320497 A1* | 10/2014 | Vojnovic | G06T 11/206 345/440 |
| 2015/0103131 A1 | 4/2015 | Denoue et al. | |
| 2015/0106629 A1 | 4/2015 | Anderson et al. | |
| 2016/0378846 A1 | 12/2016 | Luse et al. | |
| 2019/0215464 A1* | 7/2019 | Kumar | H04N 7/147 |
| 2019/0379742 A1* | 12/2019 | Simpkinson | G06K 9/00288 |

* cited by examiner

SYSTEMS AND METHODS FOR IDENTIFYING PARTICIPANTS IN MULTIMEDIA DATA STREAMS

CROSS-REFERENCE TO RELATED APPLICATIONS

This application claims priority to and the benefit of U.S. Provisional Patent Application No. 62/756,806 filed on Nov. 7, 2018, the entire disclosure of which is incorporated in its entirety by reference herein.

FIELD OF THE INVENTION

The invention relates generally to using computer-based techniques and supporting systems to identify participants within recorded communication, and more specifically, the use of domain-specific knowledge to associate communication content identity features to disambiguate participant identities.

BACKGROUND

Digital Video communication (i.e., video conferencing initiated and/or video content created by an organization to communicate internally with employees and externally with prospects, customers, clients, partners, and other third parties) is seen as the next stage of human distance-communication technology. Indeed, the prior art has witnessed the adoption and growth of Internet-based video communication apps, products, and services (e.g., Cisco WebEx, GoToMeeting, Microsoft Skype for Business, Microsoft Teams, Google Hangouts, Skype, CafeX, Apple FaceTime, Zoom, BlueJeans, and so forth), as well as video created for display using media and tools (e.g., Vidyard, Kaltura, Brightcove, Panopto, YouTube, Vimeo, Facebook, and the like). Use of (e.g., digital) video communication has increased dramatically in an effort to improve communication with external customers, clients, partners, and the public, while at the same time having to address competitive forces and public demand to use contemporary, inexpensive, Internet packet-based methods of communication.

One challenge faced by users of such systems is to establish and assure accurate identification of all participants (persons) within the organization's digital communications. Establishing the identity of participants within digital communication, however, can be a difficult problem for a computing system to solve. For example, a computing system may not be aware of specific identities of the participants or be able to differentiate among participants as accurately as humans can.

One conventional solution requires the provision of participant identities through some external registration mechanism. For example, each participant may be prompted to self-assign his or her identification at the application or communication platform layer, or use some method of shared authentication to access the communication platform. Problematically, there are shortcomings to any system using pre-registration to identify participants. For example, participants habitually may use diminutives, nicknames, or handles instead of using a formal or legal name. Additionally, in many instances, systems may allow participants to forego or bypass the registration process in favor of some service expediency. Where registration is mandatory and expedient measures are taken, errors in identification of participants are common.

An approach that avoids registration uses facial recognition. However, facial recognition systems require supervised training against known, pre-identified faces to provide identity.

Additionally, for applications that allow for shared environments, e.g., teleconferencing or video conferencing, there may be instances in which each data-gathering endpoint enables multiple persons to participate, further confusing pre-registered identity. For example, if several people in the same office need to participate in a video conference with participants at other locations, a shared conference room may be used. Problematically, even though there may be multiple participants in the video conference sitting together in the conference room, there may only be a single registration for the conference room endpoint (i.e., video-conference device), and, therefore, multiple participant identities may be associated with this single device registration.

SUMMARY OF THE INVENTION

Accordingly, an automated, computer-based technique to identify participants (for example, to a video conference) is needed that does not rely on external registration and/or on supervised training to address these and other limitations of pre-registration-based identity systems.

In audio and video media, participants may be discovered and identified by collecting and collating identity features that may be distributed across the media content. Exemplary features may include, for the purpose of illustration rather than limitation: visual likeness, participant voice, screen name, and so forth. Advantageously, the identities of the participants may be learned by processing, collecting, and collating a number of identity features into high-probability identities. In short, in some embodiments, the present invention recognizes and creates associations among a myriad of identity features. These associations may be periodically or continually revised and modified until a certain confidence level is achieved for each participant in the communication.

Aspects and embodiments of the invention may provide techniques and supporting systems to obtain, for example, from video and audio content, high-confidence participant identities using a graph-edge modification process to disambiguate user or participant identities from each other. In some applications, an unsupervised mechanism (e.g., a processing device) may build or create digital identities for participants from content available from digital media. Such an application avoids dependence or reliance on external identity pre-registration or information that may be otherwise available via network transport or application data. While the present application may avoid dependence or reliance on external identity pre-registration or information that, creating digital identities may still be supplemented by pre-registration and/or other external identity information.

In some embodiments, accuracy of the technique may be measured based on identification of the participant(s) with high confidence from the metadata available from the digital communication, and not necessarily measured by identification of the participants' formal or legal names. Indeed, in some applications, an arbitrary system-generated identification may be assigned to each participant profile. In other embodiments, multiple distinct participant identities from one or more digital communications may be aggregated or combined into a single high-confidence identity for the user. Such techniques may be applied to content related to compliance, oversight, privacy, and law enforcement.

In a first aspect, the present invention relates to a method of identifying a discrete participant among a plurality of participants in an audio/video communication (e.g., video content, digital video content, audio content, and audiovisual content). In some embodiments, the method includes: receiving, by a processor(s), the audio/video communication; identifying from the audio/video communication content, by the processor(s), (e.g., using metadata from the broadcast content to identify each participant) identification-related features for each participant; associating, by the processor(s), a first identification-related feature of a first participant to a second identification-related feature of the first participant; organizing, by the processor(s), the associated identification-related features of the first participant into one of a number of feature classes; logically relating, by the processor, a first feature class to a second feature class; and attributing a grouping of logically-related feature classes to the discrete participant. In some implementations, the method may further include associating, by the processor, a third identification-related feature of the first participant to the first identification-related feature and/or to the second identification-related feature of the first participant and logically relating, by the processor, a third feature class to the first feature class and/or to the second feature class.

In some applications, using metadata may include capturing metadata from a visual frame(s) of the audio/video communication and/or capturing metadata from an audio stream(s) of the audio/video communication. In some variations, the visual frame may be selected from the group consisting of: a scene feature, an object feature, a text feature, a logo feature, a facial image feature, and a combination thereof and/or the audio stream may be selected from the group consisting of: a voice feature, a spoken name feature, an audio transcript feature, and a combination thereof.

In some implementations, the identification-related features may include participant voices, screen names, or visual likenesses. In some applications, the feature class may include: a video metadata class, an audio metadata class, and/or an application metadata class. Video metadata subclasses may include: a frame scene subclass, a frame face subclass, a frame object subclass, a frame logo subclass, a frame display name subclass, a frame contact information subclass, and a combination thereof; audio metadata subclasses may include: a voice audio subclass, a voice subclass, an audio transcript subclass, a spoken name subclass, and a combination thereof; and application metadata subclasses may include: a participant channel subclass, an account subclass, an email identification (ID) subclass, a chat identification (ID) subclass, a chat handle subclass, a network address subclass, and a combination thereof.

In some variations, organizing may include organizing the associated identification-related features as vertices in a graph based on a featured class, such that relating feature classes may include logically connecting a vertex of the first feature class to a vertex of the second feature class or to a vertex of any additional feature class.

In a second aspect, the present invention relates to system for identifying a discrete participant among a plurality of participants in an audio/video communication. In some embodiments, the system may include a computer processor(s) programmed to perform operations that may include: receiving the audio/video communication; identifying from the audio/video communication content (e.g., using metadata from the broadcast content to identify each participant) identification-related features for each participant; associating a first identification-related feature of a first participant to a second identification-related feature of the first participant; organizing the associated identification-related features of the first participant into one of a number of feature classes; logically relating a first feature class to a second feature class; and attributing a grouping of logically-related feature classes to the discrete participant. In some implementations, the computer processor(s) may be programmed to perform operations that may include associating a third identification-related feature of the first participant to the first identification-related feature and/or to the second identification-related feature of the first participant and logically relating a third feature class to the first feature class and/or to the second feature class.

In some applications, using metadata may include capturing metadata from a visual frame(s) of the audio/video communication and/or capturing metadata from an audio stream(s) of the audio/video communication. In some variations, the visual frame may be selected from the group consisting of: a scene feature, an object feature, a text feature, a logo feature, a facial image feature, and a combination thereof and/or the audio stream may be selected from the group consisting of: a voice feature, a spoken name feature, an audio transcript feature, and a combination thereof.

In a third aspect, the present invention relates to an article of manufacture that includes a non-transitory computer-readable medium having instructions stored thereon that, when executed by a computer processor(s), cause the computer processor(s) to perform operations that include: receiving the audio/video communication; identifying from the audio/video communication content a number of identification-related features for each participant; associating a first identification-related feature of a first participant to a second identification-related feature of the first participant; organizing the associated identification-related features of the first participant into a feature class(es); logically relating a first feature class to a second feature class; and attributing a grouping of logically-related feature classes to the discrete participant.

DESCRIPTION OF THE FIGURES

Advantages of some of the embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

At a summary level, embodiments of the disclosed technique use metadata from digital communication media (e.g., digital video data from a digital media source) and organize useful identification-related features of participants appearing in the digital communication media into identity feature classes, which may be referred to as "colors". A visual graph of identity features may then be created in which the identity features may be represented by, for example, graph vertices. If an evidence-based relationship between graph vertices exists, the graph vertices may be connected by an edge. In some implementations, edges may be weighted to indicate either a likelihood or probability of association (referred to as an "evidence graph"). At this point, the system may apply a graph-edge modification algorithm(s) to the evidence graph to selectively remove graph edges, iteratively, until there is an optimal collection of vertices. The graphical representation may then be converted into a "colorful component graph," in which each connected component contains at most one identity feature from a plurality of identity feature classes. Once components in the graph have been identified, a high-confidence identity set or cluster may be assigned to each of the participants.

In some instances, external processes may be used to collect metadata from, for example, a digital video recording or digital data stream. For example, an exemplary external process may use the process described in U.S. patent application Ser. No. 15/916,946, which is incorporated in its entirety herein by reference.

Certain implementations may include repeating the process across multiple digital media files to create a library of high-confidence identities that the system may reference for identification in lieu of participant registration or artificial intelligence (AI) supervised learning.

Figure 10A:
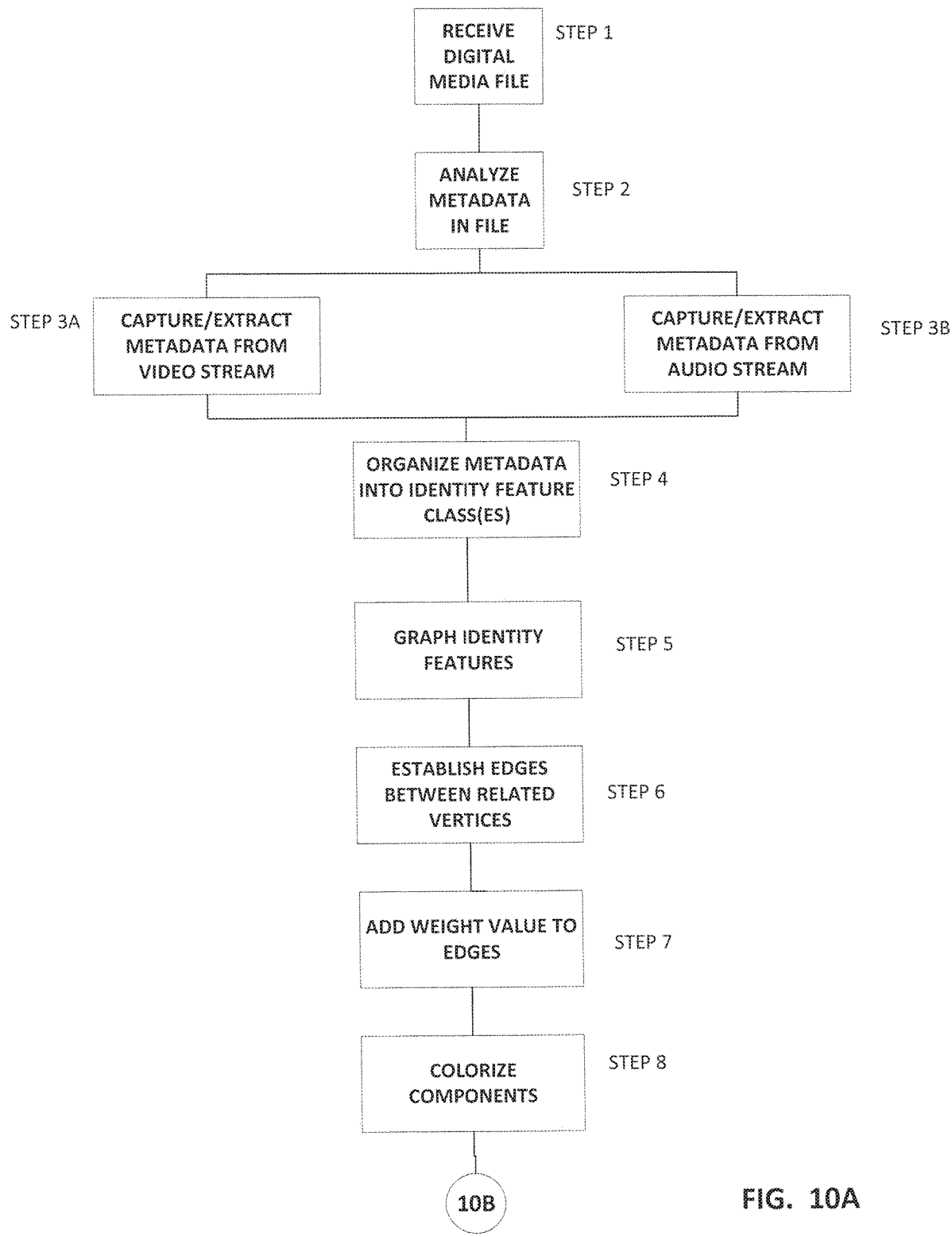
FIGS. 10A and 10B show a flow chart of an exemplary method of identifying participants in multimedia data streams, in accordance with some embodiments of the present invention.
Figure 10B:
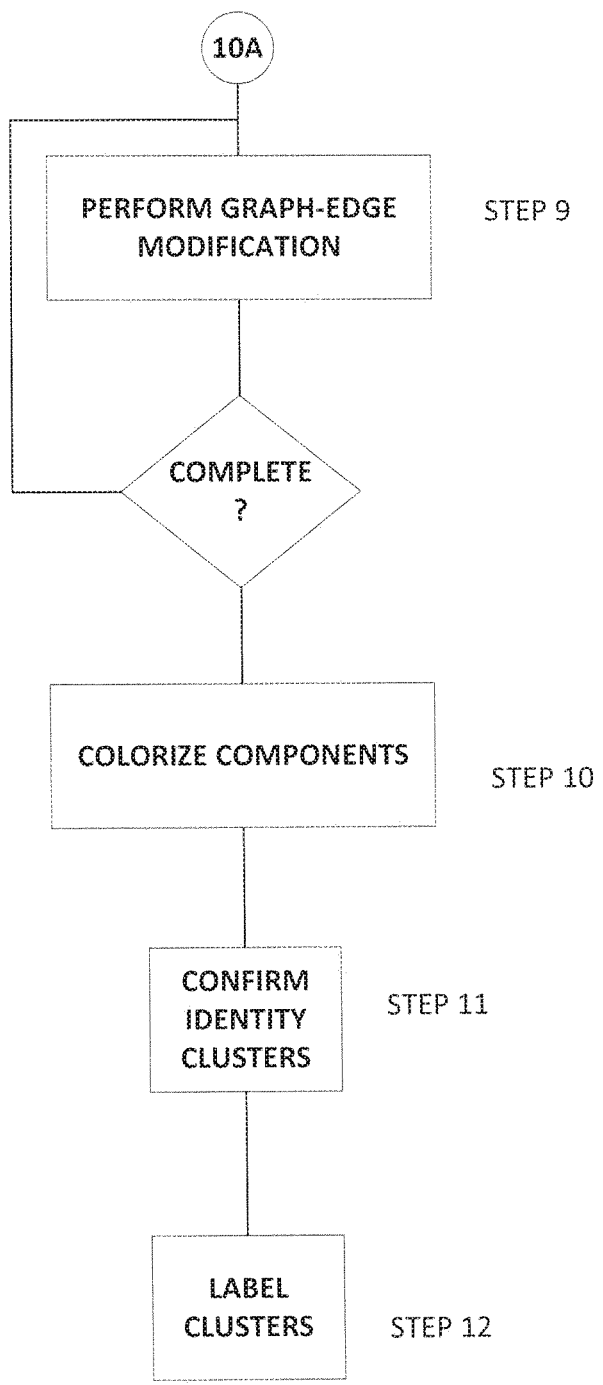
Figure 11:
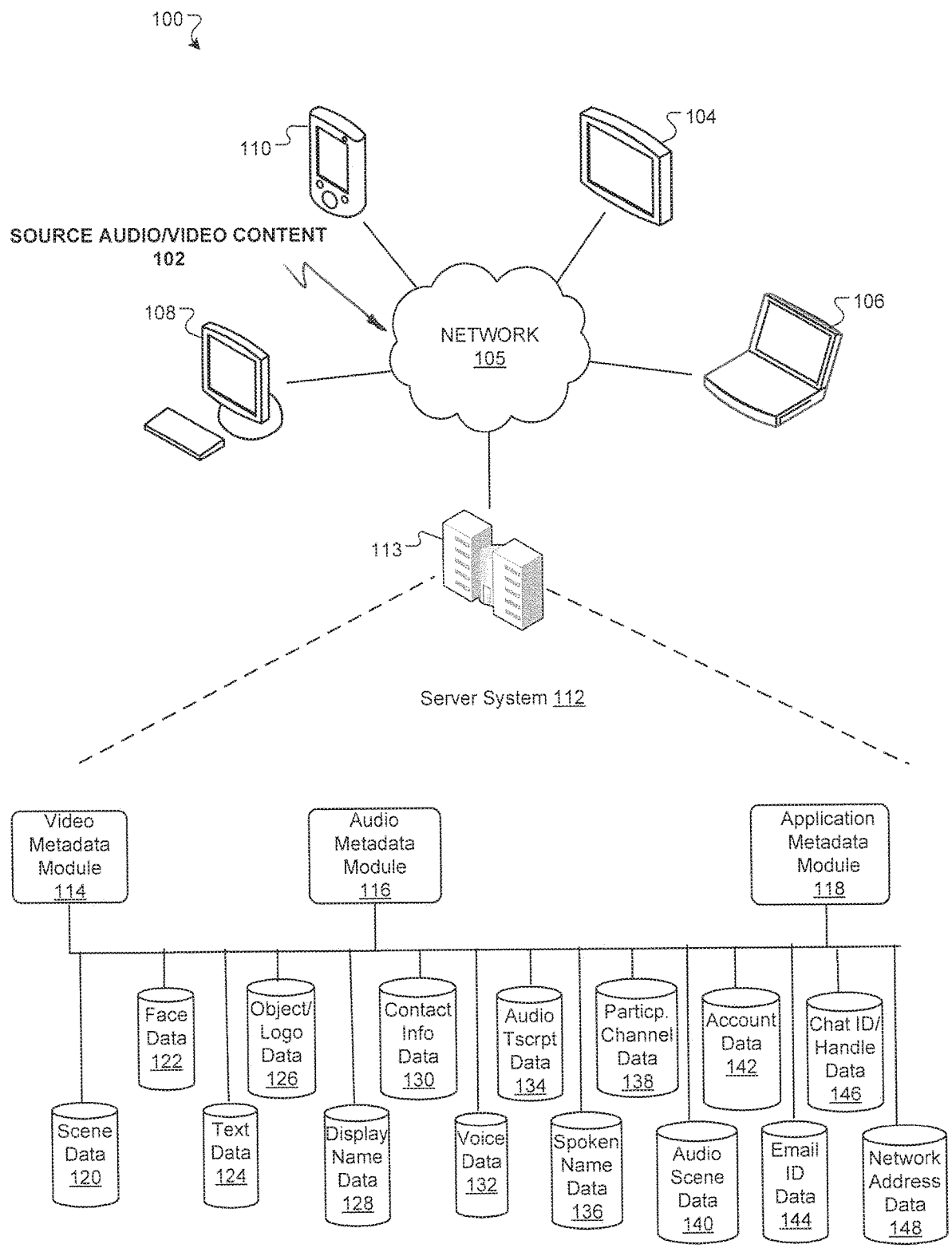
FIG. 11 shows an illustrative system for identifying participants in a digital video communication, in accordance with some embodiments of the present invention.

Referring to FIGS. 10A and 10B, an illustrative embodiment of a method of identifying participants in a multimedia data stream(s) is shown. Initially, useful identification-related features may be identified and organized into a plurality of identity feature classes. For example, the system may receive a digital media file (STEP 1) (e.g., a digital media file in MP4, MKV, MOV, or other format) via, for example, a programming interface, email, a Web site, and so forth. The method or means of delivery is less important than that the system receives the digital media file (STEP 1) fully intact, including necessary metadata. Advantageously, the system need not participate in or broadcast the digital video communication via a digital video communication network, nor act as an endpoint within the digital video communication platform.

Figure 1:
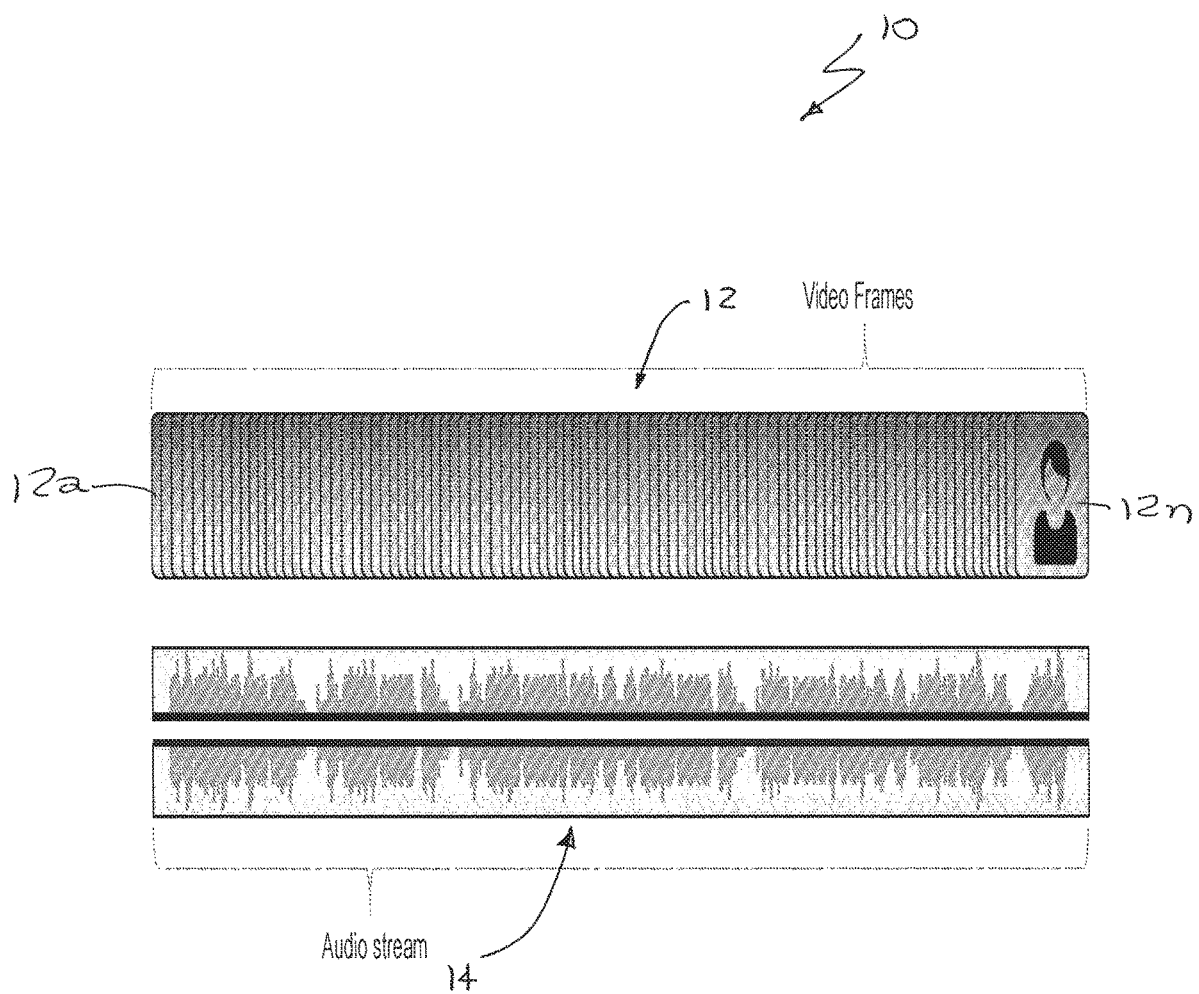
FIG. 1 shows visual representations of a multiplicity of video frames from a video stream and of a corresponding audio stream sampled from a recorded digital video media file, in accordance with some embodiments of the present invention.
Figure 2:
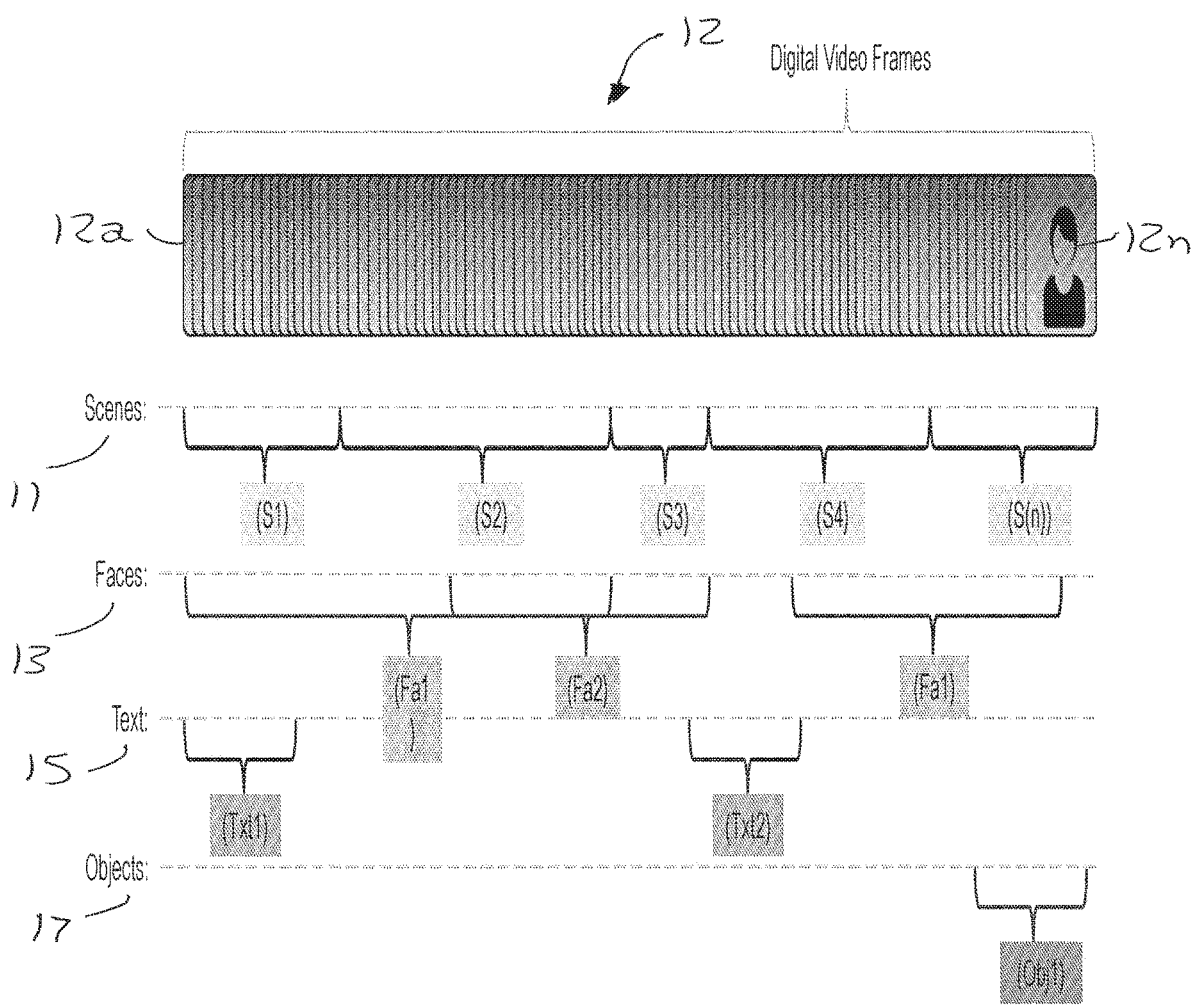
FIG. 2 shows an illustrative metadata analysis (e.g., by scenes, faces, text, and objects) of the multiplicity of video frames from the recorded digital video media file of FIG. 1, in accordance with some embodiments of the present invention.

In some applications, the system may then analyze the digital communication media using various conventional metadata analysis techniques (STEP 2). For example, FIG. 1 shows an exemplary visual representation of a digital video recording media file 10 that includes a video stream 12 consisting of or consisting essentially of a series of video frames 12a . . . 12n, as well as an audio stream 14. In some implementations, the metadata analysis (STEP 2) may capture or extract metadata from the digital media content within the visual (i.e., video) frames 12a . . . 12n (STEP 3A). In some implementations, video metadata may be captured or extracted (STEP 3A) based on, for the purpose of illustration rather than limitation, metadata that may be further classified as scenes 11, facial images (or faces) 13, text 15, objects 17, logos, and so forth. For example, as shown in FIG. 2, metadata analysis applied to digital video media 12 (STEP 3A) may analyze the metadata, such that the system extracts, from one or more of the digital video frames 12a . . . 12n, metadata that may be classified as: a plurality of scenes 11 (S1, S2, S3, . . . S(n)); a plurality of facial images 13 (Fa1, Fa2, . . . ); text 15 displayed in the visual frames (Txt1, Txt2, . . . ); and any recognizable objects 17 (Obj 1, . . . ) appearing in the visual frames; and the like.

Figure 3:
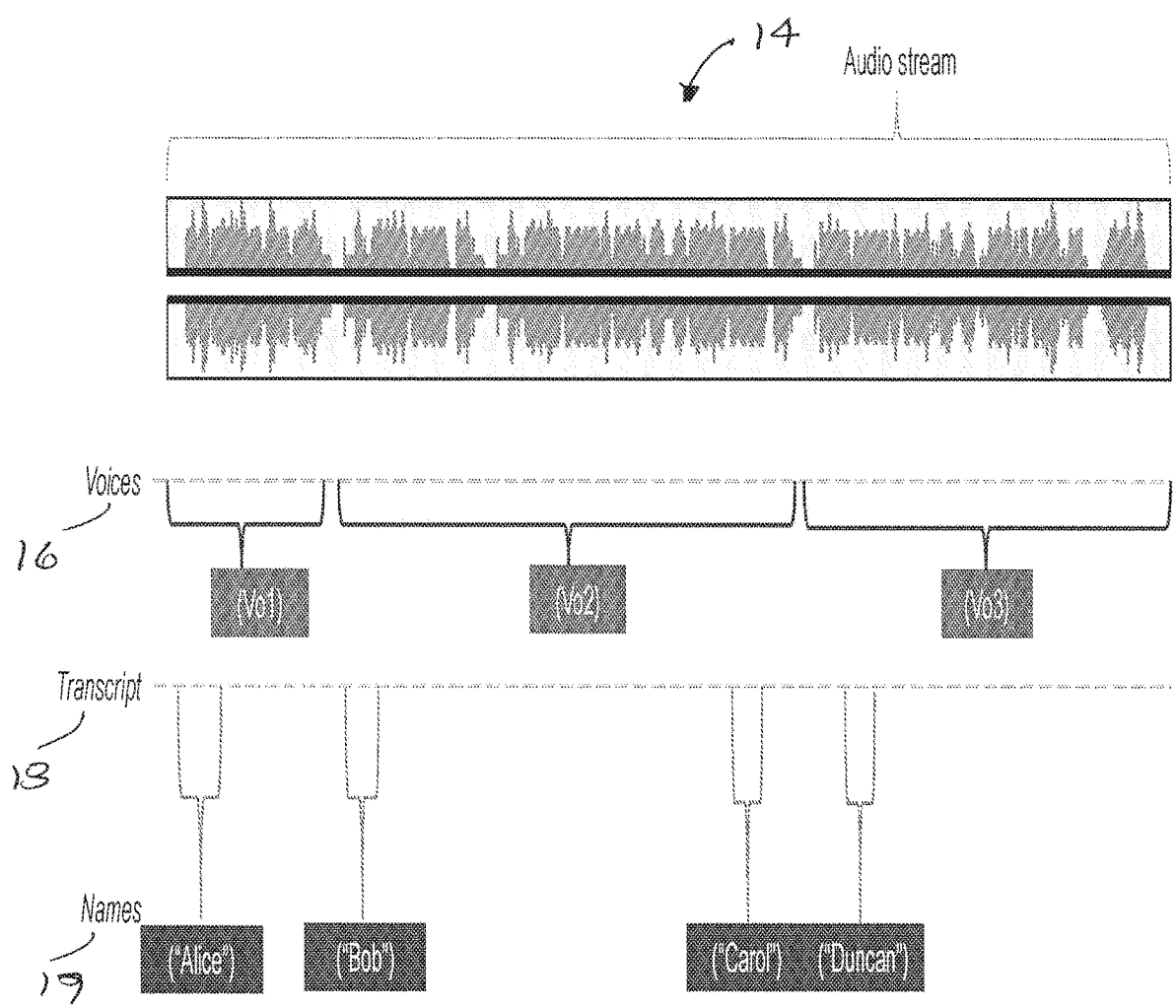
FIG. 3 shows an illustrative metadata analysis (e.g., by voices, transcript, and spoken names) of the audio stream from the recorded digital video media file of FIG. 1, in accordance with some embodiments of the present invention.

Metadata analysis may also capture metadata from the audio stream (STEP 3B). For example, in some implementations, audio content metadata may be captured or extracted (STEP 3B) that, for the purpose of illustration rather than limitation, may be further classified as voices 16, portions of the audio transcript 18, spoken names 19, and so forth. For example, as shown in FIG. 3, metadata analysis applied to the audio stream 14 (STEP 3B) may analyze the metadata, such that the system extracts, from selective portions of the audio stream 14, metadata that may be classified as: voices (Vo1, Vo2, Vo3) 16; portions of the audio transcript 18; spoken names ("Alice", "Bob", "Carol", and "Duncan") 19; and the like.

Figure 4:
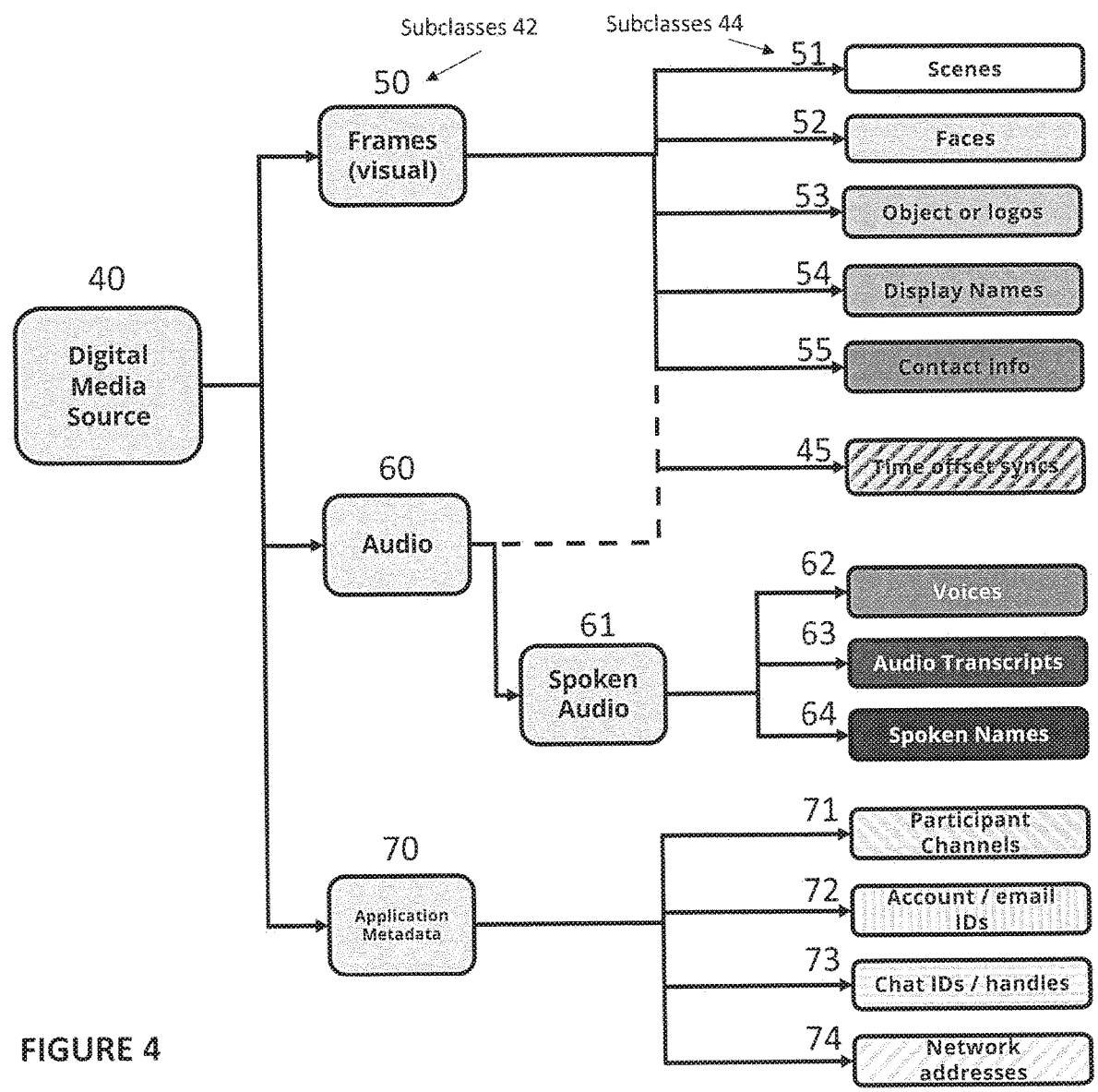
FIG. 4 shows an exemplary tree for classifying profile metadata from a digital media source, in accordance with some embodiments of the present invention.

The system may be adapted to organize the various classifications of digital video metadata into identity feature classes (STEP 4). In some variations, each feature class may be assigned a unique identifier (e.g., a color). Moreover, as shown in FIG. 4, the digital media source metadata 40 may be separated into a multi-level classification tree. In some applications, a first classification level 42 may separate the metadata into visual or frame metadata 50, audio metadata 60, and application metadata 70; each class may be further separated into descriptive subclasses 44. In some variations, the system may further classify information based on the analysis of the metadata, such as time offset and time synchronization 45.

For example, for the frame metadata class 50, exemplary subclasses 44 may include (for the purpose of illustration rather than limitation): frame scenes 51, frames faces 52, frame objects/logos 53, frame display names 54, frame contact information 55, and the like. The frame scene subclass 51 may refer to, for example, a sequence of individual images from the video that generally show the same visual setting and set of participants. For example, within a video conference recording, Alice (a participant) may be on video camera in her office (a visual setting). As long as "Alice in her office" is present as the primary video feed, that would be considered a single "scene". When the video feed changes to any other participant or shared content, the scene may be considered to have changed, and a new scene is active. The frame face subclass 52 may refer to, for example, visual metadata of participants whose facial features provide, with a certain degree of certainty, a facial identification of the participant by comparison with facial data pertaining to the individual that have been stored in a memory for that purpose. The frame objects/logos subclass 53 may refer to, for example, visual metadata of inanimate objects or things that may be associated with a participant (e.g., a pair of glasses, jewelry, and so forth) based on a comparison with object/logo data associated with the individual that have been stored in a memory for that purpose. The frame display name subclass 54 may refer to, for example, visible name tags, name plates, and the like that may be attached or affixed to or placed proximate (e.g., in front of) the participant, such that an association may be made between the participant and the name displayed on the name tag, name plate, and the like. The frame contact information subclass 55 may refer to, for example, instances in which a participant may provide information on camera or, alternatively, a shared screen that other participants may use to establish communication with the provider at another time. Such information may include, for the purpose of illustration rather than limitation: phone numbers, email addresses, mailing (e.g., street) addresses, Twitter handles, Facebook names, Web URLs, YouTube channel names, social media hashtags, barcodes, QR codes, and the like.

For the audio metadata class 60, exemplary subclasses 44 may include (for the purpose of illustration rather than limitation): spoken audio 61, voices 62, audio transcripts 63, spoken names 64, and the like. The spoken audio subclass 61 may refer to, for example, the collection of all audio that collectively represents the participants' voices present on the video communication, and not just the individual voices of the participants. The voices subclass 62 may refer to, for example, audio metadata of an individual participant's voice pattern that may provide, with a certain degree of certainty, the participant's identity by comparison with voice pattern data pertaining to the individual that have been stored in a memory for that purpose. The audio transcripts subclass 63 may refer to, for example, spoken audio that has been converted to text through some (e.g., external) transcription process. Representative transcription processes may include human or automated processes. The spoken names subclass 64 may refer to, for example, instances in which other participants refer to one participant by a name, nickname, and the like, from which, with a certain degree of certainty, the participant may be associated with that name, nickname, and the like.

For the application metadata 70, exemplary subclasses 44 may include (for the purpose of illustration rather than limitation): participant channels 71, account/email IDs 72, chat IDs or handles 73, network addresses 74, and the like. The participant channel subclass 71 may refer to, for example, separate audio streams or recordings or separate video streams or recordings, for each connected participant, made by the video communication platform or application. In some variations, the platform may create a separate audio channel for each participant in the video communications. The account/email ID subclass 72 may refer to, for example, instances in which the video communication platform or application may embed (e.g., as text) the logged-in user account or email address for each participant in the video stream or in the video stream metadata (e.g., as a metadata tag). The chat ID or handle subclass 73 may refer to, for example, instances in which each individual participant may provide (e.g., as text) her own identification, friendly-name, or "handle" that may not be specifically associated with her registration/account/email identification. More specifically, a user that may register with the platform or application as a.alexander@example.ai, while the application may allow her to provide a name (e.g., "Alice") as a chat ID. The network address subclass 74 may refer to, for example, instances in which the platform or application tracks the logical network address (e.g., IPv4 address, IPv6 address, or other communication layer address) which may be used by the platform or client.

Upon examining the video media, data about each participant found in the media may be collected. Advantageously, data may be categorized by type into a specific asset class. For reference each specific asset class may be shown graphically and referred to as a separate and distinct color.

Once identified and classified, the system builds the evidence graph. More specifically, each data point and asset class may be placed on a graph as vertices that, initially, are not linked by edges. For example, as shown in FIGS. 5-9, participant/identity features represented by the metadata elements extracted from and identified within the media content may then be organized as vertices 52 in a graph (STEP 5).

Subsequently, evidence in the form of information that may come directly from the video metadata subclasses may be used to link individual data points to one another. As shown in the graph, edges 54 drawn between vertices 52 connote such links. Evidence is a set of domain specific rules that establish what can be proven from the metadata taken from the video stream. For example, it may be known that there are three unique communication channels from the application layer, that the application's participant ID's in the communication are associated with specific channels and no other, that three different voices are present in the media, and that these different voices are only present in each individual communication channel. Thus, edges may be logically drawn between the communication channel, the participant ID, and the voice audio.

Figure 6:
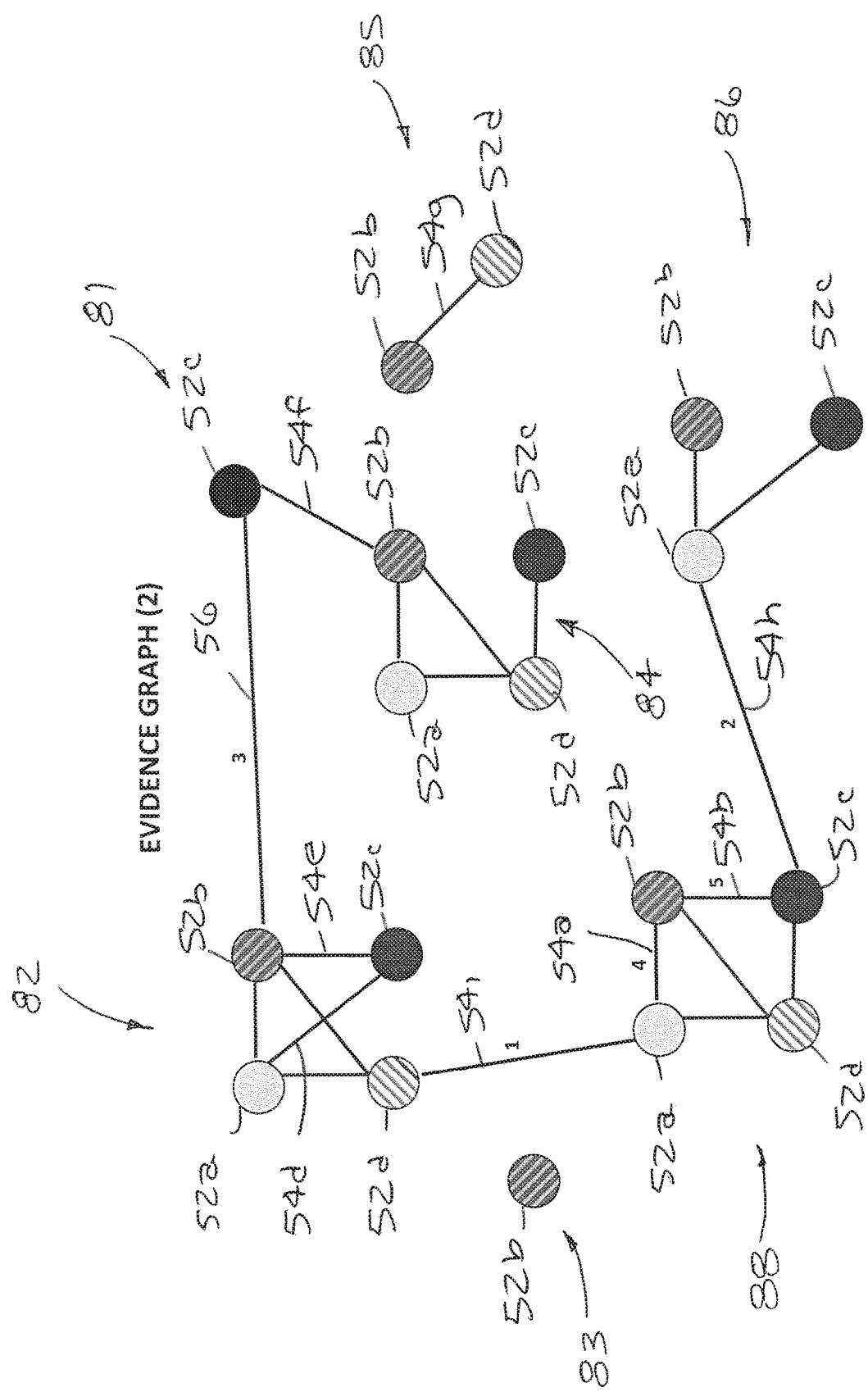
FIG. 6 shows a modification of the graphical representation of FIG. 5 which is annotated with scored edges among vertices between identity features, in accordance with some embodiments of the present invention.

FIG. 6 shows illustratively a collection of some vertices 52 attached to some other vertices 52 through edges 54; however, not all vertices 52 are connected. This early stage may suggest clusters of vertices 52 (i.e., graph components) connected by edges 54, however, it is unlikely to be optimal. One or more of the vertices 52 may include an associated color unique for the particular class. When a relationship or association, with a suitable degree of certainty, is established (STEP 6) between discrete vertices 52 for different classes an edge 54 may connect the related vertices 52. As will be described in greater detail, optionally, a weight value may be assigned to edges 54 (STEP 7) to reflect the likely degree of certainty or probability of the relationship or association between vertices 52. For example, a weight value of 5 (on a scale from 0 to 5) may be assigned to an edge 54 between related vertices 52 with a high-probability relationship or association; while a weight value of 1 may be assigned to an edge 54 between vertices 54 with a low-probability relationship or association.

Figure 5:
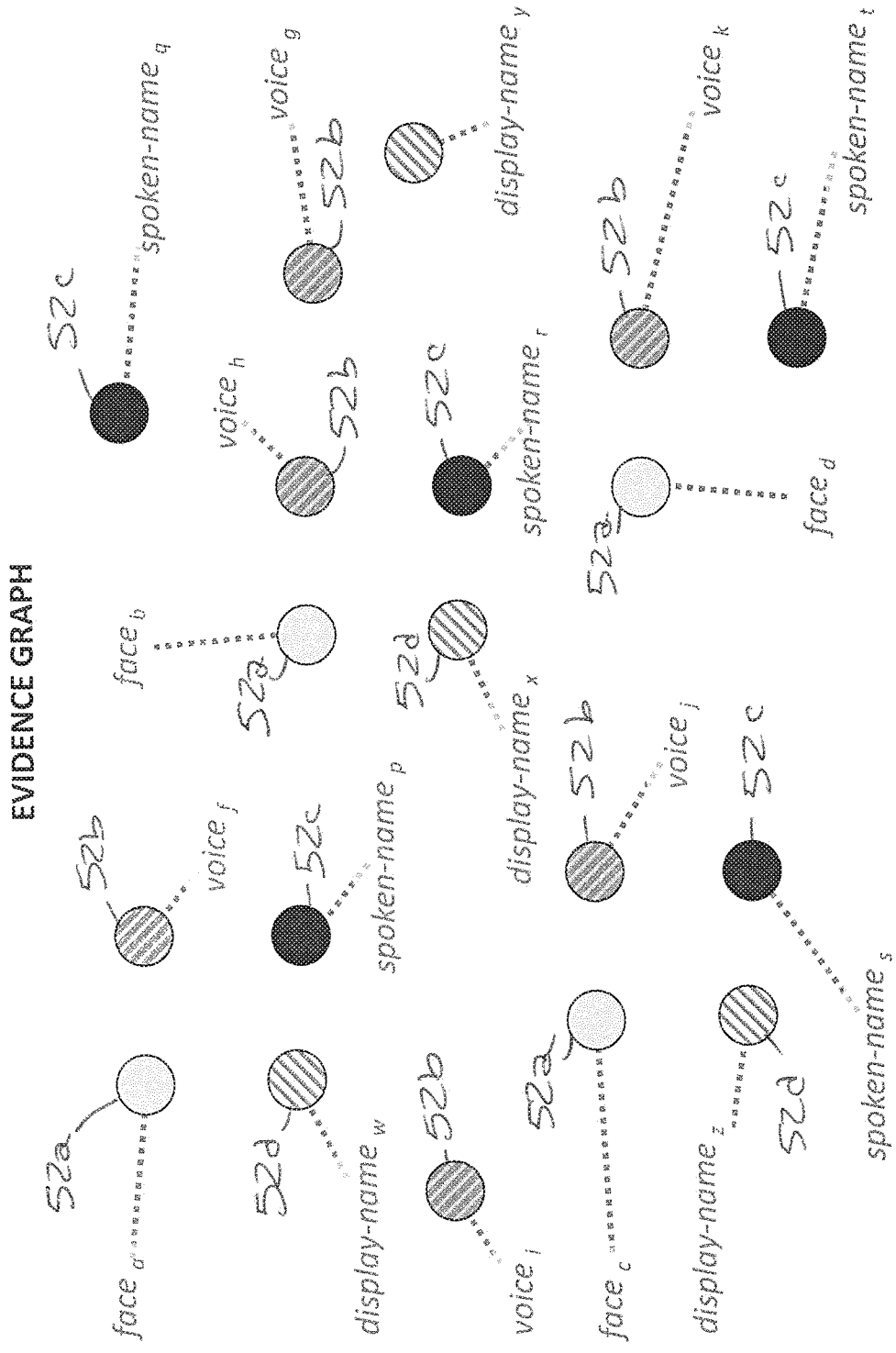
FIG. 5 shows an exemplary graphical representation of participant identity features as captured from a digital video media file during an initial stage of the process, in accordance with some embodiments of the present invention.

For example, FIG. 5 illustrates an initial creation of a multiplicity of vertices 52 for participant/identity features. At this initial stage, the vertices 52 appear as unrelated information. For the purpose of illustration, rather than limitation, the various vertices 52 may include the following subclasses: faces 52a (further labeled: a, b, c, d), voices 52b (further labeled: f, g, h, i, j, k) spoken names 52c (further labeled: p, q, r, s, t), and display names 52d (further labeled: w, x, y, z).

Referring to FIG. 6, the system may then use information associated with the vertices 52a, 52b, 52c, 52d, as well as stored information about participants, to draw edges 54 between related participant/identity features, indicative of a relationship or association between the vertices 52. There are many approaches the system may use to determine where to draw an edge 54 between related or associated or potentially-related and -associated vertices 52. For example, domain-specific knowledge about video and audio content may be used to make positive (or highly probable) associations between participant/identity features. Such relationships or associations may be created using evidence from the media content data that are obtained from the digital video stream 12, from the audio stream 14, or a combination thereof.

For example, using both the digital video stream 12 and the audio stream 14, a first edge 54a may be created between a face feature 52a appearing in a visual scene of a digital video frame 12 and a voice feature 52b that is present in a portion of the audio stream 14 that occurs contemporaneously or simultaneously with the digital video frame 12. Due to the temporal agreement between the face feature 52a in the digital video stream 12 and the voice feature 52b in the audio stream 14, the system may assign a relatively high-probability association to the edge 54a. More specifically, the system may create an edge 54a by detecting a face feature 52a accompanied by motion of that face (e.g., movement proximate the participant's mouth) in a visual scene of a digital video stream 12 occurring at the same or substantially the same time that a single voice feature 52b is detected in the audio stream 14. Once again, due to the temporal agreement between the face feature 52a and movement of the participant's mouth identified in the digital video stream 12 and the voice feature 52b in the corresponding audio stream 14, the system may assign a relatively high-probability association to the edge 54a.

In another example, using just the audio stream 14, a voice transcript may capture the phrase "My name is Alice," such that the system may be able to create a second edge 54b between a voice feature 52b and a spoken name feature 52c in the same portion of the audio stream 14. The system may assign a relatively high-probability association to the edge 54b due to the simultaneous occurrence of the voice feature 52b and a spoken name feature 52c.

In another example, a face feature 52a may be strongly associated with a screen name feature 52d when both features appear in the same scene of the digital video stream 12. In such instances, the system may create a third edge 54c between the face feature 52a and the screen name feature 52d. Optionally, the system may place registration information as to the participant's identity on-screen.

In yet another example, the system may generate an audio transcript from the one or more audio streams that are part of the video conversation. Analysis of the audio transcript may determine that an email address has been spoke. For example, the transcript may read: "one may reach Alice at alice@example.ai".

In a further example, we may have a participant whom we know is named Bob, and an email address bob@example.ai. Although, these data may provide a positive association (e.g., an edge) between "Bob" and the email address, since there may be other participants named "Bob" in this media, the edge would have a low affinity score to account the other "Bobs" present.

An "ideal" participant graph may result from drawing edges 54 from the evidence so that each component contains exactly one asset class/color of each type, connected by edges 54 to all the other asset classes within a cluster. Experience and domain knowledge, however, demonstrate that an ideal clustering of vertices is an unlikely result. Indeed, there may be some vertices 52 connected to two or more vertices 52 of the same asset class/color. In such instances, edges 54 between different vertices 52 must be removed so that the graph may be modified to as close to an ideal graph as possible.

As previously mentioned, an affinity score of association between two vertices 52 may be assigned to the edge 54 created between those edges (STEP 7). The affinity score assigned may be a high value or a low value, depending on whether there is some likelihood of a relationship or association (deemed "high value") between participant/identity features or, alternatively, there is some likelihood that no relationship or association (deemed "low value") may exist between participant/identity features. Positive (or negative) relationships or associations may indicate a varying degree (i.e., high to low) of probability or certainty of affinity (or lack thereof). For example, a high-probability, high value association results in a higher affinity score of the corresponding edge 54 between potentially-related vertices 52, while a low-probability, positive association results in a lower affinity score of the corresponding edge 54 between questionably-related vertices 52.

In some instances, while building the evidence graph, the system may be able to use evidence to not place an edge 56 between two vertices 52, indicating that, more likely than not, the vertices 52 are not related or associated to each other. For example, after a participant's face is seen for the first time in a digital video scene 12, the audio transcript may include a spoken name feature 52c that occurs in several voice features 52b, such that the system may create an edge 54d having a high-probability association between the face feature 52a and the spoken name feature 52c. For example, if several participants greet a new participant with "Hi, Carol!" the system may create an edge 54d between Carol's face feature 52a and her associated spoken name feature 52c. Because several other participants greeted her as Carol, the system may attribute a relatively high probability, positive score to the edge 54d.

Assuming that there is only one Carol participating in the gathering, meeting, conference, and the like, since all or some number of the other participants have identified a face feature 52a with the spoken name feature 52c "Carol," then the system may attribute, with a relatively high degree of certainty, "not Carol" to the other participants. Thus, while creating a relatively high-probability edge 54d between Carol's face feature 52a and Carol's spoke name feature 52c, simultaneously, the system may not make an association the face features 52a of the other (i.e., not Carol) participants and any of Carol's high-probability identify features 52.

In addition to creating initial edges 54 between associated or related vertices 52, as shown in FIG. 6, the system may be adapted to begin to identify participant/identity feature clusters 82, 84, 85, 86, 88, which may be attributed to a participant, as well as to identify participant/identity feature outliers 81 and 83, which may not be attributed to a participant. As to the latter, the spoken name feature 52c associated with a first outlier 81 may refer to a name of a non-participant that was spoken during the meeting or conference documented with the digital video media content 12 and the audio media content 14 and the voice feature 52b associated with the second outlier 83 may correspond to a non-participant who entered the room and said something that was contained in the audio media content 14.

An ideal participant/identity feature cluster would include all of the participant/identity features 52, as well as high-probability edges 54 created between all of the participant/identity features 52. However, the system is configured to identify participants accurately and with a relatively high-probability of certainty in less than ideal conditions. Indeed, the system may identify participant/identity feature clusters that include less than all of the participant/identity features 52; less than all edges 54 created between these participant/identity features 52; and/or edges 54 with less than a high-probability affinity score. For example, referring to FIG. 6, a first potential participant/identity feature cluster 82 includes all four of the participant/identity features 52a, 52b, 52c, 52d, as well as edges 54 between the face feature 52a and the voice feature 52b, between the face feature 52a and the spoken name feature 52c (i.e., edge 54d), between the face feature 52a and the display name feature 52d, between the voice feature 52b and the display name feature 52d, and between the voice feature 52b and the spoken name feature 52c (i.e., edge 54e). However, there is no edge 54, between the spoken name feature 52c and the display name feature 52d. Moreover, the display name feature 52d includes an edge 54i to another face feature 52a. A second potential participant/identity feature cluster 84 also includes all four of the participant/identity features 52a, 52b, 52c, 52d; however, there are no edges 54 between the face feature 52a and the spoken name feature 52c or between the spoken name feature 52c and the voice feature 52b. Moreover, the voice feature 52b includes an edge 54f to another spoken name feature 52c.

A third potential participant/identity feature cluster 85 includes a single edge 54g between only two of the participant/identity features 52b, 52d. A fourth participant/identity feature cluster 86 includes three of the participant/identity features 52a, 52b, 52c and edges created between the face feature 52a and the voice feature 52b and between the face feature 52a and the spoken name feature 52c. There are no edges 54, however, between the voice feature 52b and the spoken name feature 52c. Moreover, the face feature 52a includes an edge 54h to a second spoken name feature 52c.

A fifth potential participant/identity feature cluster 88 includes all four of the participant/identity features 52a, 52b, 52c, 52d, as well as edges 54 created between the face feature 52a and the voice feature 52b (i.e., edge 54a), between the face feature 52a and the display name feature 52d, between the voice feature 52b and the spoken name feature 52c (i.e., edge 54b), between the voice feature 52b and the display name feature 52d, and between the display name feature 52d and the spoken name feature 52c. There is no edge 54, however, between the face feature 52a and the spoken name feature 52c. Moreover, the spoken name feature 52c includes an edge 54h to the face feature 52a of the fourth participant/identity feature cluster 86 and the face feature 52a includes an edge 54i to the display name feature 52d of the first participant/identity feature cluster 82.

Once the evidence graph has been completed, such that many vertices 52 have been connected by edges 54 and, optionally, some or all of the edges 54 have been assigned a weight, the system may perform graph-edge modification (e.g., using a graph-edge modification algorithm(s)) to remove low-probability edges 54f, 54h, 54i, 56 between vertices 52 (STEP 9). Advantageously, the system may be adapted to perform graph-edge modifications on the graph edges 54, without relying on the domain specific information of the vertices 52. The system may perform one or more graph-edge modifications using methods well-known to those skilled in the art. The edge modification process converts the graph into a "colorful components graph" by removing as few edges as possible. Alternatively, the edge modification process may convert the graph into a colorful components graph by removing the set of edges 54, 56 where the combination of the affinity scores on those edges 54, 56 is highest or lowest.

Figure 7:
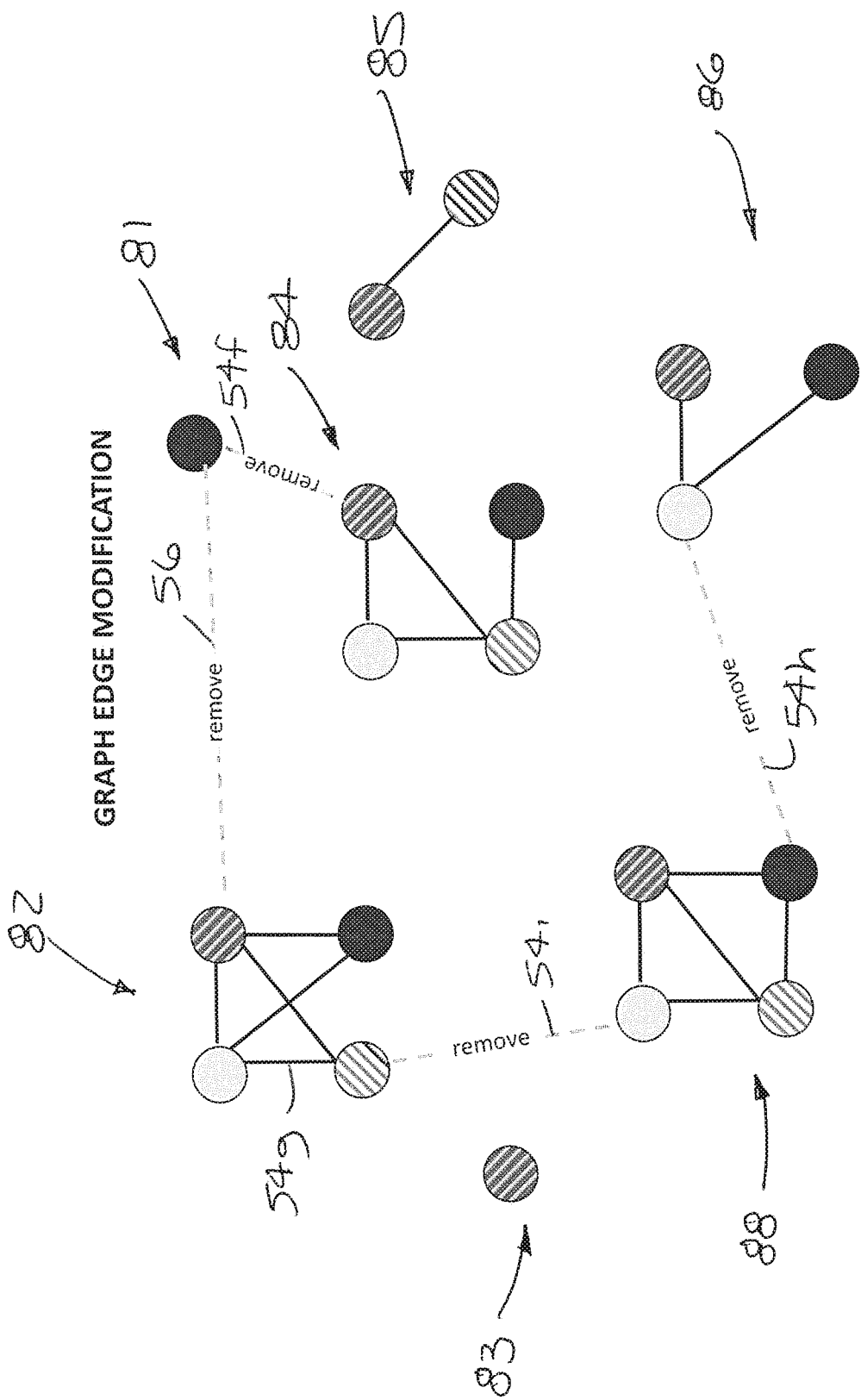
FIG. 7 shows a modification of the graphical representation of FIG. 6, in which certain edges between identity features have been removed, in accordance with some embodiments of the present invention.

Referring to FIG. 7, an exemplary method for removing four edges 54f, 54h, 54i, 56 between vertices 52 is shown. In some applications, in the context of the example, the system may determine that the affinity scores attributed to these edges 54f, 54h, 54i, 56 fall below a minimum threshold affinity score; the relative probabilities associated with the edges 54f, 54h, 54i, 56 exhibit an unacceptably low probability of being associated or related; and/or the relative probabilities associated with the edges 54f, 54h, 54i, 56 exhibit a lower probability of being associated or related than another edge 54 containing one of the two vertices 52 connected by the (removed) edge 54f, 54h, 54i, 56.

For example, the graph-edge modification may be adapted to remove the edge 56 connecting a voice feature 52b of the first participant/identity feature cluster 82 to a spoken name feature 52c (i.e., outlier 81), since, by convention, negative edges 56 connote the absence of any association or relationship. Graph-edge modification also may be adapted to remove the edge 54f connecting the spoken name feature 52c of the first outlier 81 and the voice feature 52c of the second participant/identity feature cluster 84. Removal may be due to the affinity scores attributed to the edge 54f falling below a minimum threshold affinity score. Graph-edge modification may further be adapted to remove the edge 54i connecting the display name feature 52d of the first participant/identity feature cluster 82 and the face feature 52a of the fifth participant/identity feature cluster 88. Removal may be due to the affinity scores attributed to the edge 54i falling below a minimum threshold affinity score. Alternatively, the (removed) probability of the edge 54i connecting the display name feature 52d and the face feature 52a may be less than the affinity score or probability of the edge 54g connecting the same display name feature 52d and the face feature 52a of the first participant/identity feature cluster 82. Graph-edge modification also may be adapted to remove the edge 54h connecting the spoken name feature 52c of the fifth participant/identity feature cluster 88 and the face feature 52a of the fourth participant/identity feature cluster 86. Removal may be due to the affinity scores attributed to the edge 54h falling below a minimum threshold affinity score. Alternatively, the affinity score or probability of the (removed) edge 54h connecting the spoken name feature 52c and the face feature 52a may be less than the affinity score or probability of the edge connecting the spoken name feature 52c and the face feature 52a of the fifth participant/identity feature cluster 88.

The edge modification process continues until the graph becomes a color components graph (STEP 10). More particularly, such modification may continue until such time as high-probability, high-value edges 54 are retained and low-probability, low-value edges 54h, 54i, 56 are removed.

Figure 8:
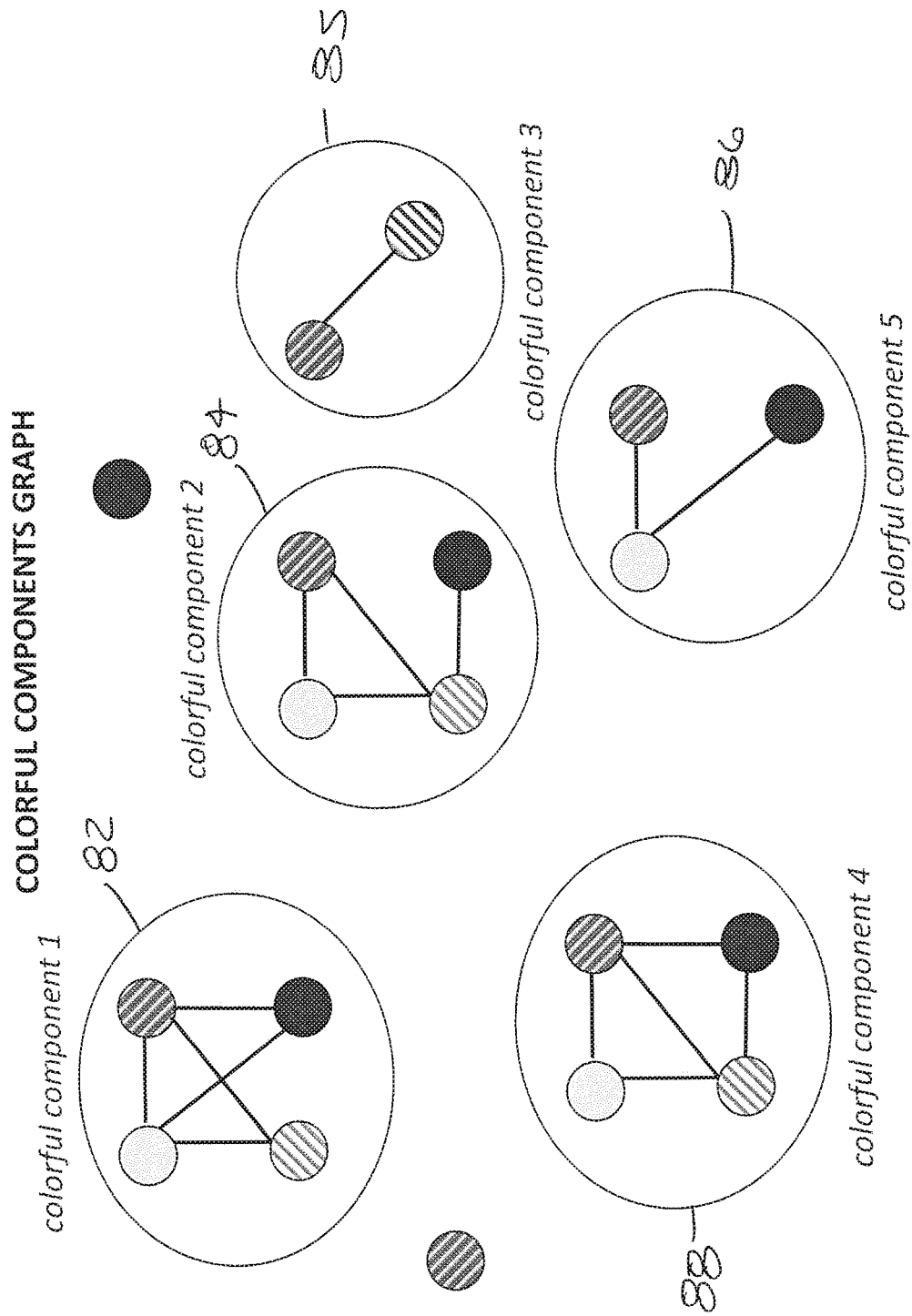
FIG. 8 shows an early stage of grouping identity features from the graphical representation of FIG. 7 into clusters of high-probability participant identities, in accordance with some embodiments of the present invention.

Referring to FIG. 8, once relatively low-probability edges 54h, 54i, 56 have been removed, the system may be adapted to re-analyze the graph to either re-define the participant/ identity feature clusters or to confirm the identities of the participants using the potential participant/identity feature clusters 82, 84, 85, 86, 88.

Figure 9:
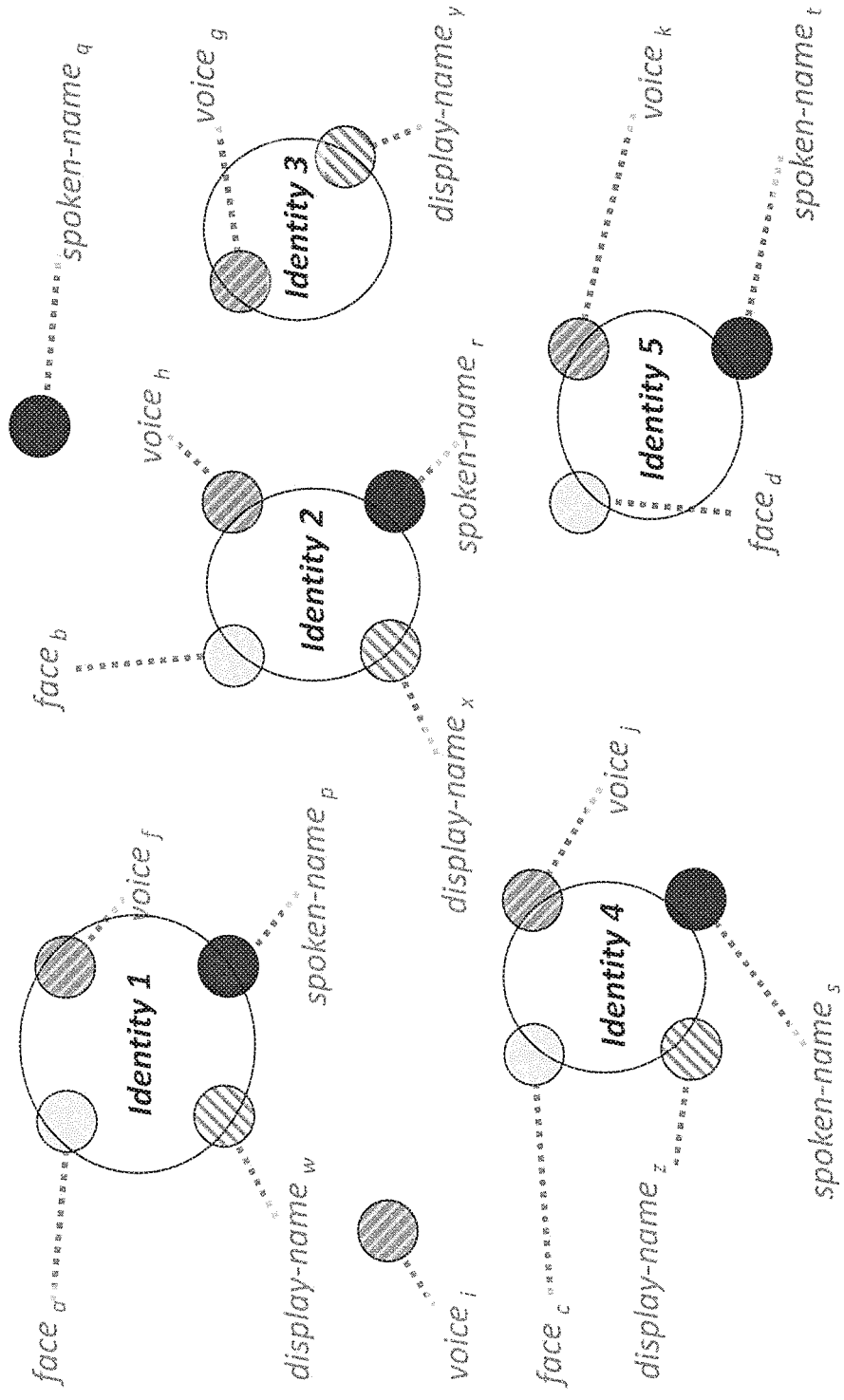
FIG. 9 shows a graphical representation of FIG. 8 with identities assigned to one or more participants, in which participants related to the clusters have been identified, in accordance with some embodiments of the present invention.

As shown in FIG. 9, once the graph reduction is complete (or has reached a point of marginal improvement), the system may identify each participant qua cluster 82, 84, 85, 86, 88 (STEP 11). As well as the profile metadata within each (e.g., colorful) cluster to assign common identity labels (STEP 12) such as user names, display names, handles, account names, and so forth, if they are available.

The identify information shown in FIG. 9 provides a strongly probable collection of identity features for each participant profile cluster 82, 84, 85, 86, 88. This information may be summarized as:

Identity 1 includes face (a,) voice (f), display-name (w), and spoken-name (p).
Identity 2 includes face (b), voice (h), display-name (x), and spoken-name (r).
Identity 3 includes voice (g) and display-name (y).
Identity 4 includes face (c), voice (j), display-name (z), and spoken-name (s).
Identity 5 includes face (d), voice (k), and spoken-name (t).

Depending on the specific needs of the implementation, optionally, the process may select an identity label from the metadata of the features within each (e.g., colorful) participant profile cluster and generate a label (STEP 12). Alternatively, a label may be generated for each (e.g., colorful) participant profile cluster, which may be designed to not include specific feature data if the implementation must support a privacy-assurance function. In some instances, for example an arbitrary identifier such as a random, pseudo-random, or mathematically assigned hash may be assigned instead of an actual identity derived from the metadata.

The disclosed invention provides systems, methods, and a computer program that process digital video communication. The content may include voice, audio, text, still images of objects or people, graphics, chat transcripts, and/or file- or document-based content exchanged among individuals or groups of people during a video communication session, and the processing may include the identification of individuals and objects or groups of participants using facial recognition and/or voice recognition, as well as the application of metadata identification. The video content may be content being broadcast and/or viewed within an organization, as well as broadcast to third parties viewing the video communication. For example, the communication may be initiated or sponsored by an organization or a member of an organization for the purpose of conducting business with consumers or other organizations. As used herein, video communication may include any video conferencing initiated and/or video content created by an organization to communicate internally with employees, externally with prospects, customers, partners, and other third parties. Such systems may include video conferencing platforms and programs (e.g., Cisco WebEx, GoToMeeting, Microsoft Skype for Business, Microsoft Teams, Google Hangouts, Skype, CafeX, Apple FaceTime, Zoom, BlueJeans, and the like). Other video display media (e.g., Videyard, Kaltura, Brightcove, Panopto, YouTube, Vimeo, Facebook, and the like) may also be used as sources for the video communication.

The above-described embodiments may be implemented in any of numerous ways. For example, the embodiments may be implemented using hardware, software, or a combination thereof. Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

When implemented in software, the software code may be executed on any suitable processor or collection of processors, whether provided in a single computer or distributed among multiple computers. Furthermore, it should be appreciated that a computer may be embodied in any of a number of forms, such as a rack-mounted computer, a desktop computer, a laptop computer, a tablet computer, and so forth. Additionally, a computer may be embedded in a device not generally regarded as a computer but with suitable processing capabilities, including, for example, a Personal Digital Assistant (PDA), a smart phone, or any other suitable portable or fixed electronic device.

Such computers may be interconnected by one or more networks in any suitable form, including as a local area network, a wide area network (e.g., an enterprise network, the Internet, and the like). Such networks may be based on any suitable technology and may operate according to any suitable protocol and may include wireless networks, wired networks, fiber optic networks, and so forth. Although examples provided herein may describe modules as residing on separate computers or operations as being performed by separate computers, it should be appreciated that the functionality of these components can be implemented on a single computer, or on any larger number of computers in a distributed fashion.

In this respect, some embodiments may be embodied as a computer-readable medium and/or as multiple computer-readable media (e.g., a computer memory, one or more floppy discs, compact discs, optical discs, magnetic tapes, flash memories, circuit configurations in Field Programmable Gate Arrays or other semiconductor devices, or other tangible computer storage medium or media) encoded with one or more programs that, when executed on one or more computers or other processors, perform methods that implement the various embodiments discussed above.

The computer-readable medium or media may be non-transitory. Alternatively, the computer-readable medium or media may be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that may be employed to program a computer or other processor to implement various aspects described in the present disclosure. Additionally, it should be appreciated that according to one aspect of this disclosure, one or more computer programs that when executed perform graph-edge modification methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules may include routines, programs, objects, components, data structures, and so forth that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish a relationship between data elements.

Also, video processing techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments, the methods may be implemented as computer instructions stored in portions of a computer's random access memory (RAM) to provide control logic that affects the processes described above. In such an embodiment, the program may be written in any one of a number of high-level languages, such as FORTRAN, PASCAL, C, C++, C#, Java, javascript, Tcl, BASIC, and the like. Furthermore, the program may be written in a script, macro, or functionality embedded in commercially-available software, such as EXCEL or VISUAL BASIC. Additionally, the software may be implemented in an assembly language directed to a microprocessor resident on a computer. For example, the software may be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, a CD-ROM, and the like.

Various aspects of the present disclosure may be used alone, in combination, or in a variety of arrangements not specifically described in the foregoing, and the invention is, therefore, not limited in its application to the details and arrangement of components set forth in the foregoing description or illustrated in the drawings. For example, aspects described in one embodiment may be combined in any manner with aspects described in other embodiments.

For example, referring to FIG. 12, an embodiment of a video communication processing system 100 capable of implementing the processes described herein is shown. The system 100 is adapted to access and receive source audio/video content 102 using any number of conventional techniques used to place, move, and/or copy a digital audio/video file. For example, the audio/video content 102 may be uploaded by an organization to the system 100 through a user-based web-portal, access from another application through Application Program Interfaces (API), or through direct service links from video application services. Client devices 102 to the network 105 may include tablet computers 104, laptop computers 106, desktop computers 108, smartphones 110, and so forth.

The digital audio/video content 102 may then be processed, such that any number of extraction scripts, programs, services, or other software may be captured and stored from the audio/video content 102. The extraction process may result in one or more still images that may be stored in a video metadata storage module 114; audio segments that may be stored in an audio metadata storage module 116, application level metadata that may be stored in an application metadata storage module 118, and so forth.

The extraction processes may include one or more processes for examining a source audio/video communication 102 by a computer program(s), where information about the video portion, the audio portion, and the application files (collectively, "metadata") of the audio/video communication 102 may be captured, stored, and subject to additional analytics, such as correlation, machine learning, and pattern matching using, for example, facial recognition, voice recognition, voice-to-text analysis, and so forth. As the digital audio/video content 102 is processed, various applications, programs, scripts, or other services may be applied to the video portion of the audio/video communication 102 to identify and tag specific content type(s) and to extract metadata and enhanced metadata from the video portion of the audio/video communication 102 for storage and subsequent use. At each processing step, the results (e.g., likenesses, images, scene changes, objects, logos, associated metadata, and so forth) may be extracted and stored in, for example, one or more of: a scene feature data database 120, a face feature data database 122, a text feature data database 124, an object (or logo) feature data database 126, a display name data database 128, a contact information data database 130, a voice feature data database 132, an audio transcription data database 134, a spoken name data database 136, a participant channel data database 138, an audio scene change data database 140, an account data database 142, an email ID data database 144, a chat ID/handle data database 146, a network address data database 148, and so forth for use in later correlation, search, and analysis.

In some implementations, the processor 113 of the server 112 of the system 100 may be adapted to extract a visual likeness(es) of each participant from the video content portion of the audio/video communication 102 to be used in present and subsequent facial recognition and/or face selection. More particularly, the system 100 may be configured to present the video portion of the audio/video communication 102 to a facial recognition algorithm of the video metadata module 114. This algorithm may capture participant likenesses, facial expressions, and similar information about the participants. Individually and collectively, these metadata may comprise a collection of likenesses for each known participant's face shown in the audio/video communication 102. From this collection, video metadata module 114 may cause the processor 113 to select the best likeness for visual clarity of each participant. Subsequently, video images of participants may be evaluated against metadata stored in facial feature libraries, e.g., the face feature data database 122. Identified matches may be labeled with the appropriate metadata, a timestamp, and stored.

The processor 113 may also extract other images from the video portion for object recognition and labeling, such that the system 100 may present some video portion of the audio/video communication 102 to an object recognition algorithm of the video metadata module 114, where the video images may be evaluated against object libraries, e.g., the object (or logo) feature data database 126. Identified matches may be labeled with the appropriate metadata, a timestamp, and stored.

The processor 113 may also be configured to extract scenes from the video portion of the audio/video communication 102 for analysis. For example, the processor 113 may be adapted to evaluate the video content from one moment to the next in order to identify if large visual changes have occurred. These video images may be evaluated against scene libraries, e.g., the scene feature data database 120. Identified matches may be labeled with the appropriate metadata, a timestamp, and stored.

In other applications, the processor 113 may be adapted to extract text from presented images, e.g., using optical character recognition (OCR). In this application, the processor 113 may hand off the video portion to an OCR algorithm that identifies text within the video. Those frames containing text may be copied to OCR functions, where the text is extracted from the image and stored, e.g., in a text feature data database 124.

Other participant-related data may also be extracted from the video portion of the audio/video communication 102. For example, user account information, screen names, email addresses, social media handles, as well as other individual identifiers may be identified in or associated with the video content, either embedded as side-channel metadata or explicitly provided by the individual participants or entity. For example, in some instances, participants in the video may be asked to share email addresses, user IDs, social media names (e.g., chat handles), or other information as a prerequisite to participating in the video and such metadata may be associated with the video in the video metadata module 114.

Other processes, software, or algorithms may be used to extract text from shared documents presented in, shared with, or used within a video communication system (e.g., WebEx). In such cases, the video metadata module 114 may cause the processor 113 to examine the video portion of the audio/video communication 102 to determine if documents (e.g., .doc files, shared documents, Adobe PDF, spreadsheets, text, slides, and the like) that may have been embedded (e.g., as side-channel metadata) in the audio/video communication 102 or may have been explicitly provided by the participants. If documents exist, they may be analyzed and recorded as document metadata and stored in a database provided for that purpose.

Considering the audio portion of the audio/video communication 102, for some implementations, voice recognition processing tools associated with the audio metadata module 116 may be used to identify individual participants within the video communication using, for example, voice biometrics. Advantageously, the resulting voiceprints may be recorded as participant voice signatures and added to the enhanced metadata associated with the video communication for storage in the voice feature data database 132. In some embodiments, the audio metadata module 116 may also cause the processor 113 to use, for example, an audio-to-text process (e.g., via conventional audio-to-text tools) to produce output as recorded, diarized transcripts to be stored in the audio transcript feature data database 134 for later use.

In yet another application, the audio metadata module 116 may cause the processor 113 to use an audio scene extraction process that uses audio analysis tools to evaluate the video portion of the audio/video communication 102 for associating a spoken name of a participant with a video image of the participant and/or for changes in the audio volume (e.g., audio silent frames vs. audio loud/noisy frames) from one moment to the next in order to identify audio scene changes. This step may be useful to establish voice diarization to positively link when different voices may be associated with different participant identities. For the former, the resulting output may be recorded and stored, e.g., in a spoken name feature data database 136, as a spoken name(s) that is associated with or can be associated with an image of the participant spoken to by other participants. For the latter, the resulting output may be recorded and stored, e.g., in an audio scene change data database 140, as an audio scene change(s) and timestamped.

Additional application metadata such as chat/instant messaging, comments and other informal participant communication may be extracted from the video content by examining the video portion of the audio/video communication 102 to determine if related instant messaging content is associated with the video portion, such as by reviewing embedded as side-channel metadata or chat data explicitly provided by the participating individuals or entity. If, for example, instant messaging is being used during the video, it can be recorded as chat metadata and stored in an appropriate database provided for that purpose with other application metadata. Metadata, as used herein, describes any information captured or created that describes or categorizes the source video stream that can be collected or generated through analysis and/or machine learning. More specifically, application metadata describes general information about the source video stream or file that can be collected with no or minimal additional analysis, such as Source IP address, source URL, file name, title, application type, video type, encoding, time and date stamp, duration, framerate, video resolution, file hash, copyright, embedded metadata (e.g. XML, XMP/RDF, MPEG-7), etc. Enhanced metadata is information about the source video stream or file which is extracted or learned through analysis, correlation, and machine learning, such as participant identities, scene changes, diarized transcripts, content topics, object identification, number of participants, types of content shared and communicated, etc.

An application metadata module 118 may be adapted to cause the server 113 to extract application metadata from the audio/video communication 102. In this process, a set of functions, an algorithm, and the like may examine the video portion of the audio/video communication 102 and capture network information (e.g., source and destination IP addresses), presentation information (e.g., video/audio encoding, time and date stamp, duration, framerate/bitrate, video resolution, and so forth), application-layer information (e.g. source URL, file name, title, application type, video type, file hash, copyright, embedded metadata (e.g. XML, XMP/RDF, MPEG-7). Other information such as number of participants, names of participants, types of content shared and communicated is also captured and recorded as application metadata. These are further classified into participant channels (individual audio and/or video streams or recordings if the application/platform separates them); account/email IDs if the application/platform includes them in the video streams or recordings; and network addresses if the application/platform includes this data from the client application endpoints.

Although the extraction processes have been described as operating serially and/or independently on the source audio/video communication, this has been done merely for clarity and comprehension. The various extraction processes may be performed in any sequence or more occur concurrently or contemporaneously. The specific sequence of processing may be specified if particular technical dependencies require such sequencing. Not all steps in the processing may be necessary for extracting metadata in all cases, and may be skipped if not needed or of the processing expense is deemed too high. For example, some audio/video communication 102 may not have all elements (e.g., no participant video, no instant messaging, no shared files, etc.) so those any extraction steps associated with the missing elements may be excluded.

Once the audio/video communication 102 has been processed and metadata and enhanced metadata have been captured and stored in an appropriate database, the audio/video communication 102 may proceed to the classification and identification analysis processes.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

What we claim is:

1. A method of identifying a discrete participant among a plurality of participants in an audio/video communication, the method comprising:
   receiving, by at least one processor, the audio/video communication;
   identifying from the audio/video communication content, by the processor, a plurality of identification-related features for each participant;
   associating, by the processor, a first identification-related feature of a first participant to a second identification-related feature of the first participant;
   organizing, by the processor, the associated identification-related features of the first participant into one of a plurality of feature classes, wherein the feature classes comprise a video metadata class, the video metadata class comprising a subclass selected from the groups consisting of: a frame scene subclass, a frame face subclass, a frame object subclass, a frame logo subclass, a frame display name subclass, a frame logo subclass, a frame contact information subclass, and a combination thereof;
   logically relating, by the processor, a first feature class to a second feature class; and
   attributing a grouping of logically-related feature classes to the discrete participant.

2. The method of claim 1, further comprising:
   associating, by the processor, a third identification-related feature of the first participant to at least one of the first identification-related feature of the first participant or the second identification-related feature of the first participant; and
   logically relating, by the processor, a third feature class to at least one of the first feature class or the second feature class.

3. The method of claim 1, wherein the audio/video communication is selected from the group comprising: video content, digital video content, audio content, and audio-visual content.

4. The method of claim 1, wherein identifying the plurality of identification-related features comprises using metadata from the audio/video communication to identify each participant.

5. The method of claim 4, wherein using metadata comprises capturing metadata from at least one visual frame of the audio/video communication.

6. The method of claim 5, wherein the visual frame is selected from the group consisting of: a scene feature, an object feature, a text feature, a logo feature, a facial image feature, and a combination thereof.

7. The method of claim 4, wherein using metadata comprises capturing metadata from at least one audio stream of the audio/video communication.

8. The method of claim 7, wherein the audio stream is selected from the group consisting of: a voice feature, a spoken name feature, an audio transcript feature, and a combination thereof.

9. The method of claim 1, wherein the identification-related features are selected from the group comprising participant voices, screen names, or visual likenesses.

10. The method of claim 1, wherein the feature classes further comprise an audio metadata class, the audio metadata class further comprising a subclass selected from the groups consisting of: a voice audio subclass, a voice subclass, an audio transcript subclass, a spoken name subclass, and a combination thereof.

11. The method of claim 1, wherein the feature classes further comprise an application metadata class, the application metadata class further comprising a subclass selected from the groups consisting of: participant channel subclass, an account subclass, an email identification (ID) subclass, a chat identification (ID) subclass, a chat handle subclass, a network address subclass, and a combination thereof.

12. The method of claim 1, wherein organizing comprises relating the associated identification-related features as vertices in a graph based on a corresponding feature class.

13. The method of claim 12, wherein relating feature classes comprises:
   logically connecting a vertex of the first feature class to at least one of a vertex of the second feature class or a vertex of any additional feature class.

14. A system for identifying a discrete participant among a plurality of participants in an audio/video communication, the system comprising:
   one or more computer processors programmed to perform operations comprising:
   receiving the audio/video communication;
   identifying from the audio/video communication content a plurality of identification-related features for each participant;
   associating a first identification-related feature of a first participant to a second identification-related feature of the first participant;
   organizing the associated identification-related features of the first participant into one of a plurality of feature classes, wherein the feature classes comprise a video metadata class, the video metadata class comprising a subclass selected from the groups consisting of: a frame scene subclass, a frame face subclass, a frame object subclass, a frame logo subclass, a frame display name subclass, a frame logo subclass, a frame contact information subclass, and a combination thereof;
   logically relating a first feature class to a second feature class; and
   attributing a grouping of logically-related feature classes to the discrete participant.

15. The system of claim 14, wherein the one or more computer processors are further programmed to perform operations comprising:
   associating a third identification-related feature of the first participant to at least one of the first or the second identification-related feature of the first participant; and
   logically relating a third feature class to at least one of the first feature class or the second feature class.

16. The system of claim 14, wherein identifying the plurality of identification-related features comprises using metadata from the audio/video communication to identify each participant, and wherein using metadata comprises capturing metadata from at least one visual frame of the audio/video communication.

17. The system of claim 16, wherein the visual frame is selected from the group consisting of: a scene feature, an object feature, a text feature, a logo feature, a facial image feature, and a combination thereof.

18. The system of claim 14, wherein identifying the plurality of identification-related features comprises using metadata from the audio/video communication to identify each participant, and
wherein using metadata comprises capturing metadata from at least one audio stream of the audio/video communication.

19. A method of identifying a discrete participant among a plurality of participants in an audio/video communication, the method comprising:
receiving, by at least one processor, the audio/video communication;
identifying from the audio/video communication content, by the processor, a plurality of identification-related features for each participant;
associating, by the processor, a first identification-related feature of a first participant to a second identification-related feature of the first participant;
organizing, by the processor, the associated identification-related features of the first participant into one of a plurality of feature classes, wherein the feature classes comprise an audio metadata class, the audio metadata class comprising a subclass selected from the groups consisting of: a voice audio subclass, a voice subclass, an audio transcript subclass, a spoken name subclass, and a combination thereof;
logically relating, by the processor, a first feature class to a second feature class; and
attributing a grouping of logically-related feature classes to the discrete participant.

20. The method of claim 19, wherein identifying the plurality of identification-related features comprises using metadata from the audio/video communication to identify each participant, and
wherein using metadata comprises capturing metadata from at least one visual frame of the audio/video communication.

21. The method of claim 20, wherein the visual frame is selected from the group consisting of: a scene feature, an object feature, a text feature, a logo feature, a facial image feature, and a combination thereof.

22. The method of claim 19, wherein identifying the plurality of identification-related features comprises using metadata from the audio/video communication to identify each participant, and
wherein using metadata comprises capturing metadata from at least one audio stream of the audio/video communication.

23. A system for identifying a discrete participant among a plurality of participants in an audio/video communication, the system comprising:
one or more computer processors programmed to perform operations comprising:
receiving the audio/video communication;
identifying from the audio/video communication content a plurality of identification-related features for each participant;
associating a first identification-related feature of a first participant to a second identification-related feature of the first participant;
organizing the associated identification-related features of the first participant into one of a plurality of feature classes, wherein the feature classes comprise an audio metadata class, the audio metadata class comprising a subclass selected from the groups consisting of: a voice audio subclass, a voice subclass, an audio transcript subclass, a spoken name subclass, and a combination thereof;
logically relating a first feature class to a second feature class; and
attributing a grouping of logically-related feature classes to the discrete participant.

24. The system of claim 23, wherein identifying the plurality of identification-related features comprises using metadata from the audio/video communication to identify each participant, and
wherein using metadata comprises capturing metadata from at least one visual frame of the audio/video communication.

25. The system of claim 24, wherein the visual frame is selected from the group consisting of: a scene feature, an object feature, a text feature, a logo feature, a facial image feature, and a combination thereof.

26. The system of claim 23, wherein identifying the plurality of identification-related features comprises using metadata from the audio/video communication to identify each participant, and
wherein using metadata comprises capturing metadata from at least one audio stream of the audio/video communication.

27. A method of identifying a discrete participant among a plurality of participants in an audio/video communication, the method comprising:
receiving, by at least one processor, the audio/video communication;
identifying from the audio/video communication content, by the processor, a plurality of identification-related features for each participant;
associating, by the processor, a first identification-related feature of a first participant to a second identification-related feature of the first participant;
organizing, by the processor, the associated identification-related features of the first participant into one of a plurality of feature classes, wherein the feature classes comprise an application metadata class, the application metadata class comprising a subclass selected from the groups consisting of: participant channel subclass, an account subclass, an email identification (ID) subclass, a chat identification (ID) subclass, a chat handle subclass, a network address subclass, and a combination thereof;
logically relating, by the processor, a first feature class to a second feature class; and
attributing a grouping of logically-related feature classes to the discrete participant.

28. The method of claim 27, wherein identifying the plurality of identification-related features comprises using metadata from the audio/video communication to identify each participant, and
wherein using metadata comprises capturing metadata from at least one visual frame of the audio/video communication.

29. The method of claim 28, wherein the visual frame is selected from the group consisting of: a scene feature, an object feature, a text feature, a logo feature, a facial image feature, and a combination thereof.

30. The method of claim 27, wherein identifying the plurality of identification-related features comprises using metadata from the audio/video communication to identify each participant, and wherein using metadata comprises capturing metadata from at least one audio stream of the audio/video communication.

31. A system for identifying a discrete participant among a plurality of participants in an audio/video communication, the system comprising:

one or more computer processors programmed to perform operations comprising:

receiving the audio/video communication;

identifying from the audio/video communication content a plurality of identification-related features for each participant;

associating a first identification-related feature of a first participant to a second identification-related feature of the first participant;

organizing the associated identification-related features of the first participant into one of a plurality of feature, wherein the feature classes comprise an application metadata class, the application metadata class comprising a subclass selected from the groups consisting of: participant channel subclass, an account subclass, an email identification (ID) subclass, a chat identification (ID) subclass, a chat handle subclass, a network address subclass, and a combination thereof;

logically relating a first feature class to a second feature class; and attributing a grouping of logically-related feature classes to the discrete participant.

32. The system of claim 31, wherein identifying the plurality of identification-related features comprises using metadata from the audio/video communication to identify each participant, and wherein using metadata comprises capturing metadata from at least one visual frame of the audio/video communication.

33. The system of claim 32, wherein the visual frame is selected from the group consisting of: a scene feature, an object feature, a text feature, a logo feature, a facial image feature, and a combination thereof.

34. The system of claim 31, wherein identifying the plurality of identification-related features comprises using metadata from the audio/video communication to identify each participant, and wherein using metadata comprises capturing metadata from at least one audio stream of the audio/video communication.

* * * * *